(12) United States Patent
Teng et al.

(10) Patent No.: US 6,962,417 B1
(45) Date of Patent: Nov. 8, 2005

(54) KEYSTONE CORRECTION SYSTEM AND METHOD

(75) Inventors: Tianbing Teng, Portland, OR (US); Michael Callahan, Tualatin, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 10/753,830

(22) Filed: Jan. 5, 2004

Related U.S. Application Data (60) Provisional application No. 60/443,422, filed on Jan. 28, 2003.

(51) Int. Cl.[7] .............................................. G03B 21/14
(52) U.S. Cl. ......................................... 353/70; 353/19
(58) Field of Search ............................ 353/69, 70, 119

(56) References Cited

U.S. PATENT DOCUMENTS

| | | | |
|---|---|---|---|
| 5,720,539 A * | 2/1998 | Woo | 353/69 |
| 6,592,228 B1 * | 7/2003 | Kawashima et al. | 353/101 |
| 6,686,973 B2 * | 2/2004 | Su | 348/745 |
| 6,793,347 B2 * | 9/2004 | Morishita | 353/119 |

* cited by examiner

*Primary Examiner*—William C. Dowling
(74) *Attorney, Agent, or Firm*—Marger Johnson & McCollom (57) ABSTRACT

The invention relates to a keystone correction system and method. The system includes a projector for projecting an image on a projection surface and a platform to allow a user to vertically rotate the projector before horizontally rotating the projector. The projector corrects for keystone distortion responsive to the projector's vertical and horizontal position. The platform increases the keystone range of the projector. The keystone correction method includes moving a projector in a vertical direction and moving a projector in a horizontal direction after moving the projector in a vertical direction.

13 Claims, 11 Drawing Sheets

KEYSTONE CORRECTION SYSTEM AND METHOD

This application claims priority from U.S. provisional patent application Ser. No. 60/443,422 filed Jan. 28, 2003, titled Method and Apparatus for Keystone Correction, which we incorporate in its entirety.

FIELD OF THE INVENTION

This invention relates to a system and method capable of projecting images and, more particularly, to a system and method capable of correcting keystone distortion in projected images.

BACKGROUND OF THE INVENTION

Figure 1:
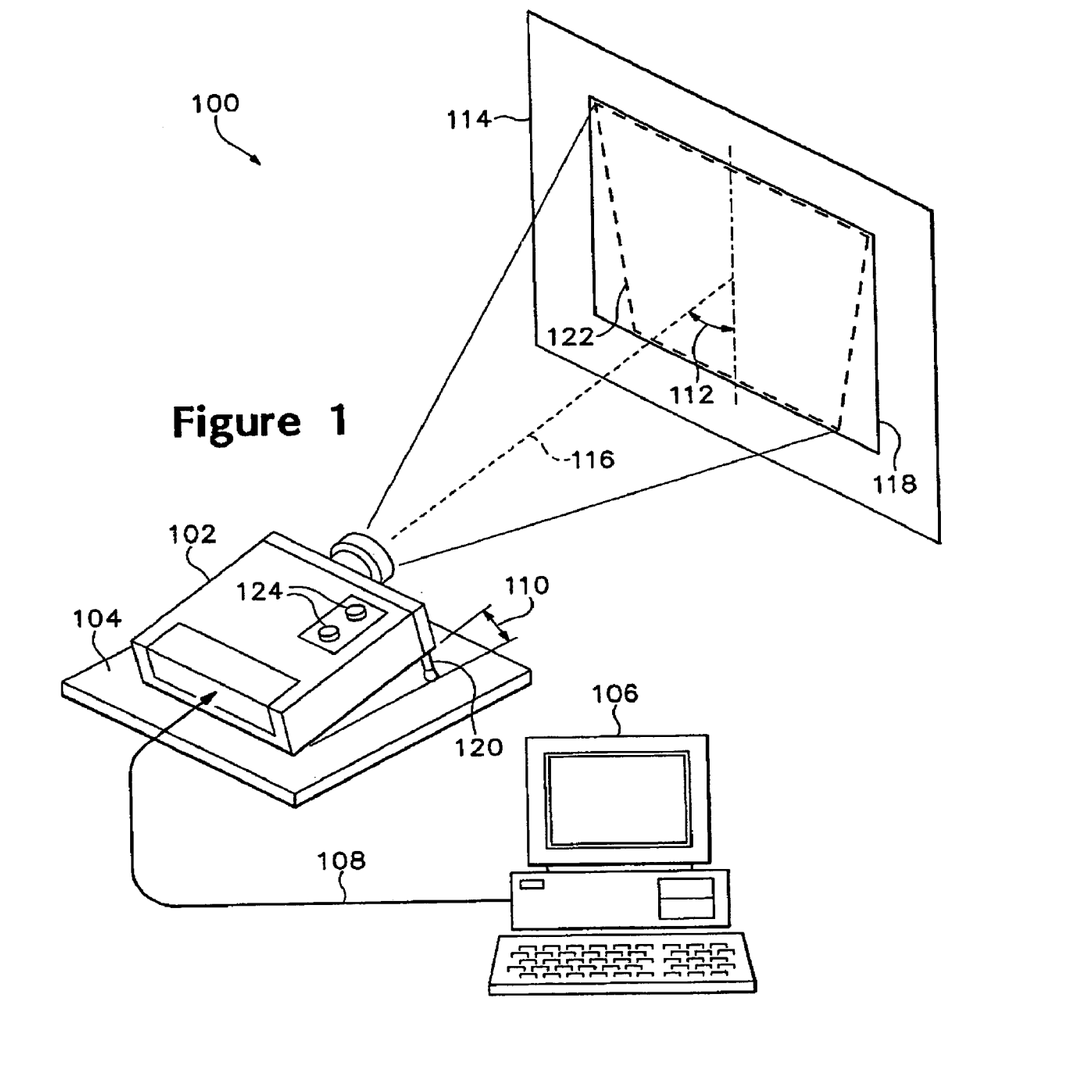
FIG. 1 is a diagram of a projection system.

Projection systems are widely used in training, sales, and business environments. Referring to FIG. 1, a projection system 100 includes a projector 102 positioned on a horizontal surface 104. The surface 104 is typically a desk or tabletop. An elevator 120 protrudes from the bottom sides of the projector 102 creating an angle 110 between the surface 104 and the projector 102. Only one elevator 120 is visible in FIG. 1 although a person of reasonable skill in the art should understand that a plurality of elevators 120 might be employed in the system 100. Likewise, a person of reasonable skill in the art should recognize that the projector 102 refers to any system capable of projecting any of a variety of still or moving images, e.g., projection televisions, multimedia projectors, computer displays, and the like.

The angle 110 varies depending on the position of the elevator 120. The elevator 120 tilts the projector 102's position relative to the surface 104 such that projected image 118 moves up or down on a projection surface 114, increasing or decreasing the angle 110. The projection surface 114 might be a wall, screen, or any other surface capable of displaying a projected image 118.

The projector 102 manipulates image signals 108 it receives from a personal computer 106. A person of reasonable skill in the art should recognize that the projector 102 might receive different types of image signals, e.g., digital or analog signals, from the personal computer 106. The image signals 108 represent still, partial, or full motion images of the type rendered by the personal computer 106.

The projector 102 casts the image signals 108 onto the projection surface 114. The resulting projected image 118 centers about a projection axis 116. An angle 112 exists between the projection axis 116 and the projection surface 114. The angle 112 changes responsive to changes in the angle 110.

The projected image 118 is substantially undistorted if the projection axis 116 is perpendicular to the projection surface 114. That is, the image 118 is undistorted if the angle 112 is 90 degrees. The projected image 118, however, distorts if the projection axis 116 is not perpendicular to the projection surface 114. This distortion is termed keystone distortion (or keystoning) because the image will appear wider at the top than at the bottom as shown in the jagged lined image 122.

Figure 2A:
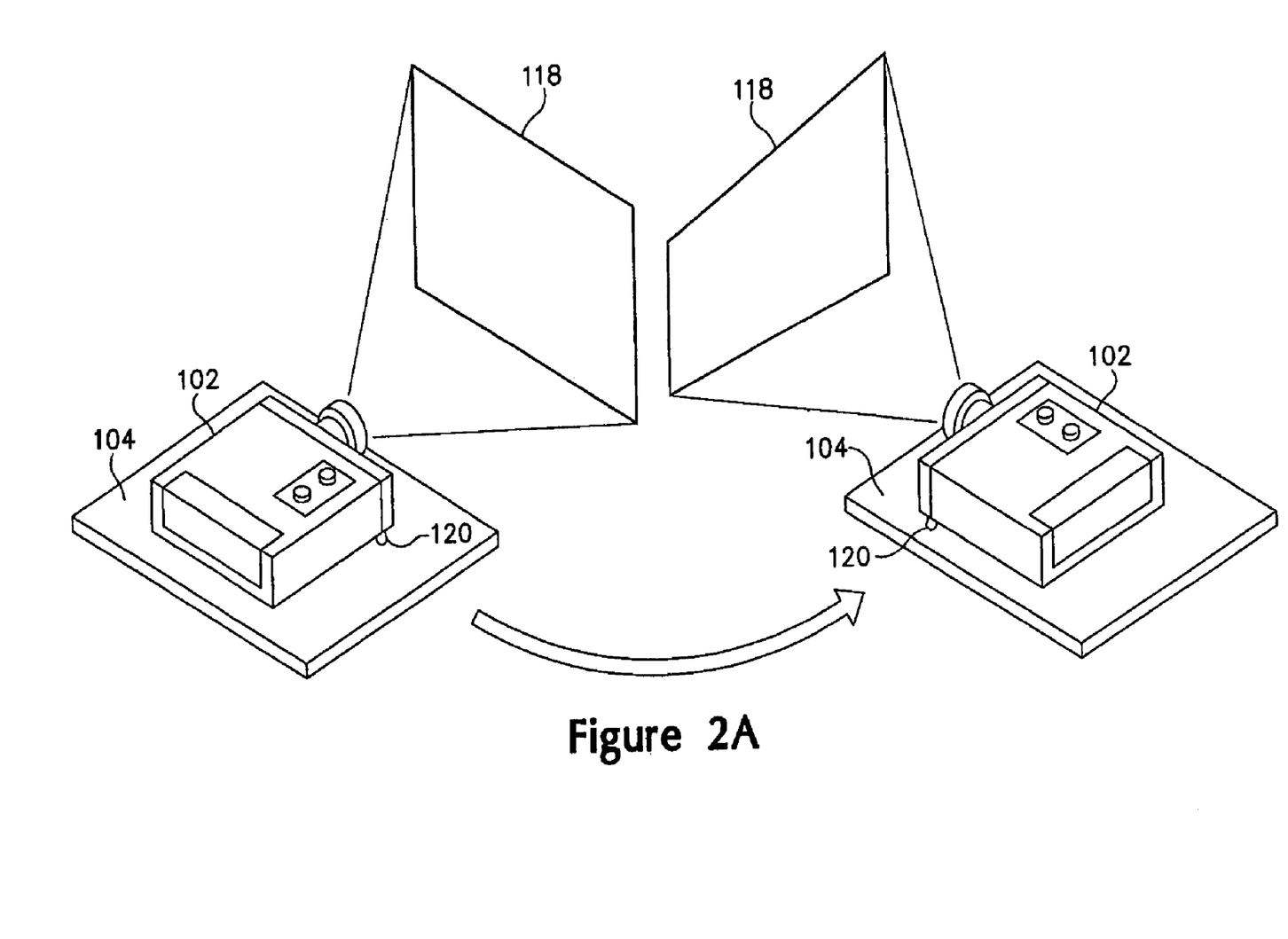
FIGS. 2A and 2B are graphic representations of a FHLV methodology.
Figure 2B:
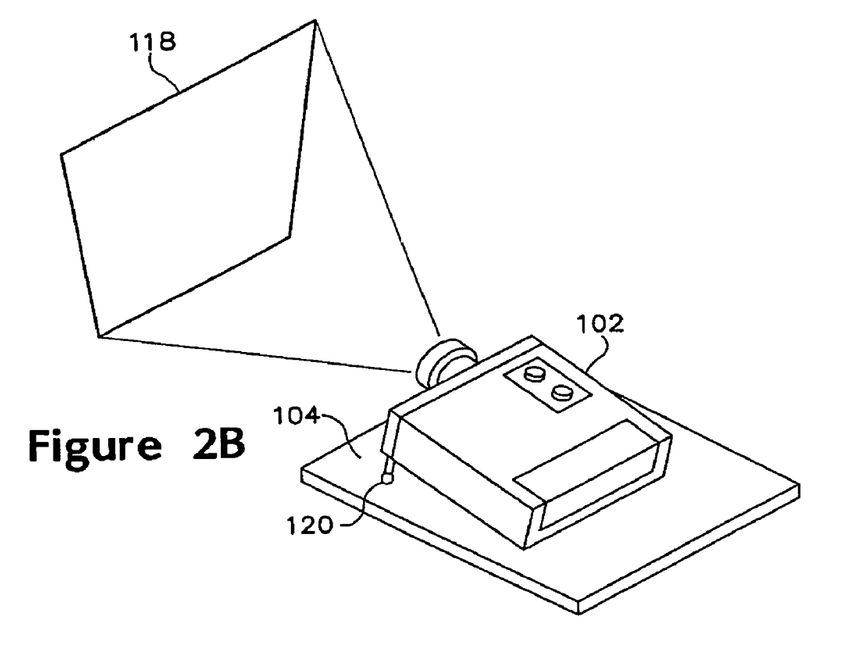

The angle the projector 102 has relative to the surface 114 is therefore important in preventing the projected image from distorting. During set up, the user will typically rotate the projector 102 using a First Horizontal Last Vertical (FHLV) methodology. Referring to FIGS. 2A–B, a user horizontally rotates the projector 102 by rotating it about the substantially flat surface 104 as shown in FIG. 2A. The user then vertically adjusts the projector 102 by e.g., raising or lowering the elevators 120 as shown in FIG. 2B. The projector's vertical adjustment raise e.g., the front two edges of the projector above the surface 104 (FIG. 2B). The projector 102's electronics and optics correct the image using hardware and software that support FHLV such that the projected image 118 exhibits diminished keystone distortion. The projector 102 corrects the image responsive to e.g., a user's input. FHLV hardware and software, unfortunately, limit the keystone correction possible due to warping restrictions. And the optics are costly and prone to dust collecting often resulting in obscured projected images.

The projector 102 might include gauges 124 used to manually adjust the projected image 118 to eliminate or minimize keystone distortion. The manual adjustments tend to move the projected image 118 out of the projection surface 114. And the manual adjustments, unfortunately, are time consuming, cumbersome, and generally an unwelcome set up complication.

Accordingly, a need remains for a keystone correction system and method.

BRIEF DESCRIPTION OF THE DRAWINGS

The foregoing and other objects, features, and advantages of the invention(s) will become more readily apparent from the detailed description of invention embodiments that references the following drawings.

DESCRIPTION OF THE INVENTION

Figure 3:
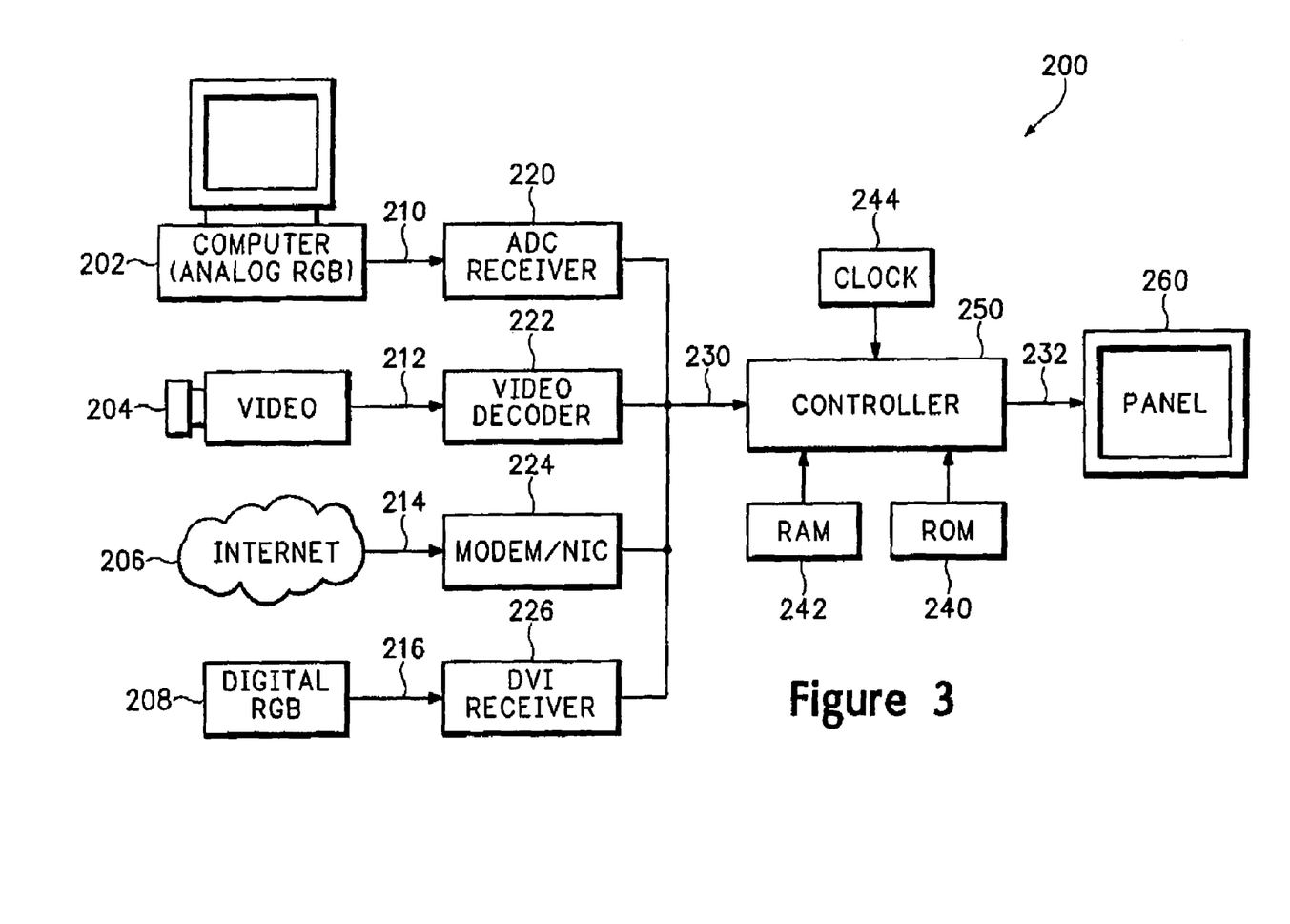
FIG. 3 is a block diagram of an embodiment of a projection system.

FIG. 3 is a block diagram of a projection system 200 according to an embodiment of the present invention. Referring to FIGS. 1 and 2, the system 200 is capable of projecting an image 118 on a projection surface 114. The system includes a receiver 220 for receiving an analog image data signal 210, e.g., an RGB signal, from a source 202. The receiver 220 might be an analog-to-digital converter (ADC) or the like. The source 202 might be a personal computer or the like. The receiver 220 converts the analog image data signal 210 into digital image data 230 and provides it to the panel controller 250.

Likewise, a video receiver or decoder 222 decodes an analog video signal 212 from a video source 204. The video source 204 might be a video camcorder and the like. The decoder 222 converts the analog video signal 212 into digital image data 230 and provides it to the panel controller 250.

A modem or network interface card (NIC) 224 receives digital data 214 from a global computer network 206 such as the Internet®. The modem 224 provides digital image data 230 to the panel controller 250.

A Digital Visual Interface (DVI) receiver 226 receives digital RGB signals 216 from a digital RGB source 208. The DVI receiver 226 provides digital image data 230 to the panel controller 250.

A person of reasonable skill in the art should recognize other sources and other converters come within the scope of the present invention.

The panel controller 250 generates panel data 232 by manipulating the digital image data 230. The panel controller 250 provides the panel data 232 to a flat panel device 260.

The panel 260 is any device capable of projecting the digital image data 230. In one embodiment, the panel 260 includes a pixelated display that has a fixed pixel structure together with the optics and electronics necessary to project the digital image data 232 on a surface 114 (FIG. 1). Examples of pixelated displays are active and passive LCD displays, plasma displays (PDP), field emissive displays (FED), electro-luminescent (EL) displays, micro-mirror technology displays, low temperature polysilicon (LTPS) displays, and the like for use in television, monitor, projector, hand held, and other like applications. The optics and electronics necessary to project the panel data 232 are well known to those of reasonable skill in the art.

In one embodiment, the panel controller 250 might scale the digital image data 230 for proper projection by the panel 260 using a variety of techniques including pixel replication, spatial and temporal interpolation, digital signal filtering and processing, and the like. In another embodiment, the controller 250 might additionally change the resolution of the digital image data 230, changing the frame rate and/or pixel rate encoded in the digital image data 230. Scaling, resolution, frame, and/or pixel rate conversion, and/or color manipulation are not central to this invention and are not discussed in further detail. A person of reasonable skill in the art should recognize that the controller 250 manipulates the digital image data 230 and provides panel data 232 to a panel 260 that is capable of properly projecting a high quality image regardless of display type.

Read-only (ROM) and random access (RAM) memories 240 and 242, respectively, are coupled to the display system controller 250 and store bitmaps, FIR filter coefficients, and the like. A person of reasonable skill in the art should recognize that the ROM and RAM memories 240 and 242, respectively, might be of any type or size depending on the application, cost, and other system constraints. A person of reasonable skill in the art should recognize that the ROM and RAM memories 240 and 242 might not be included in the system 200. A person of reasonable skill in the art should recognize that the ROM and RAM memories 240 and 242 might be external or internal to the controller 250. Clock 244 controls timing associated with various operations of the controller 250. A person of reasonable skill in the art should recognize that the projector 102 might house all or part of the controller 250, clock 244, RAM 242, ROM 240, panel 260, as well as the optics and electronics necessary to project the panel data 232.

Figure 4A:
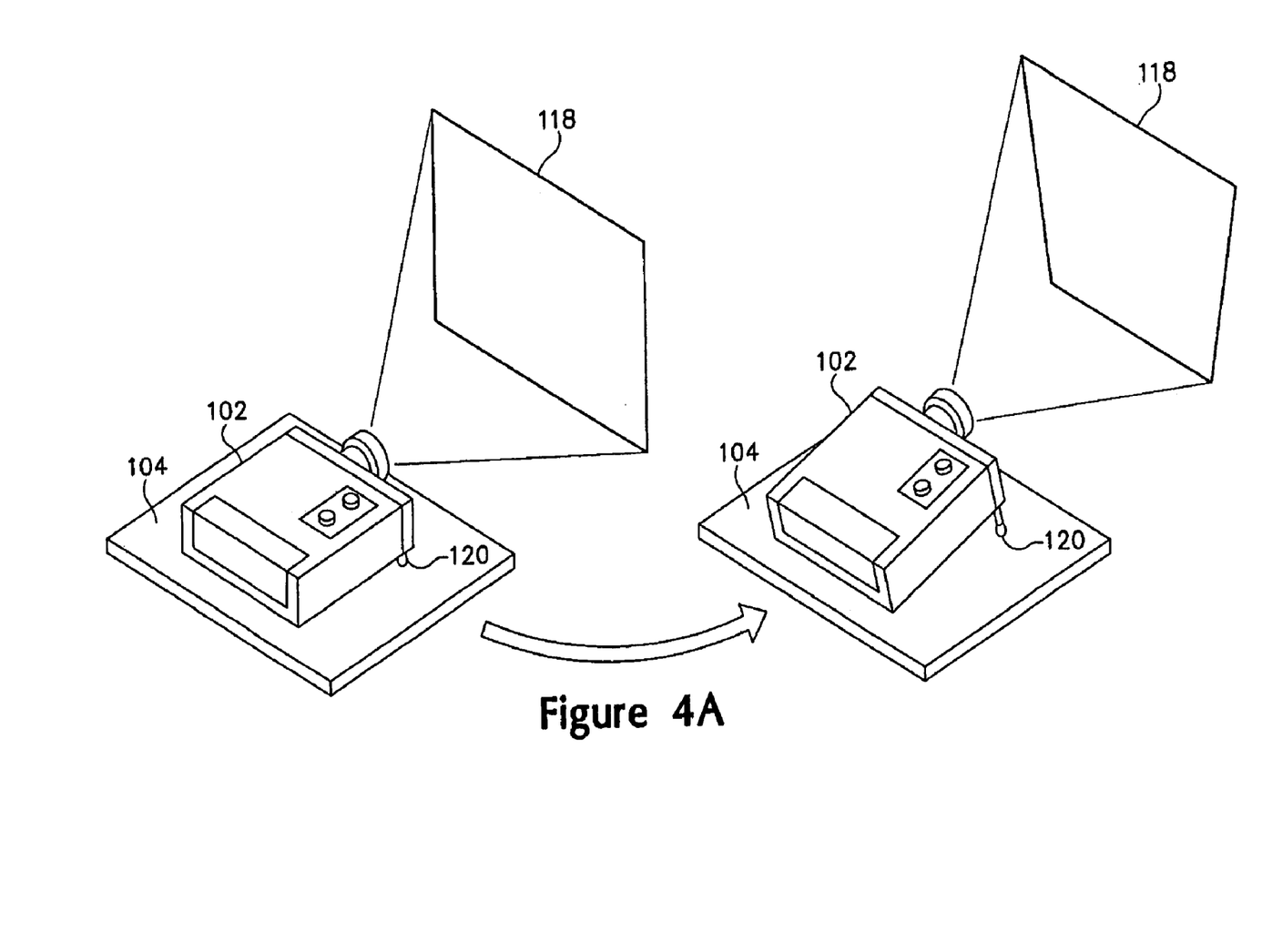
FIGS. 4A and 4B are graphic representations of a FVLH methodology.
Figure 4B:
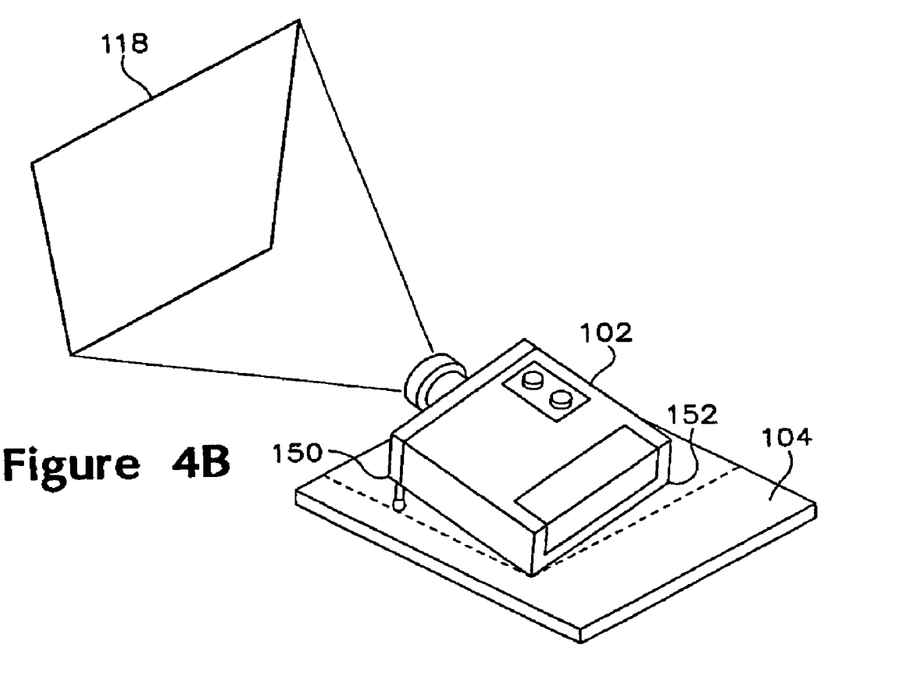

FIGS. 4A and 4B are graphic representations of a First Vertical Last Horizontal (FVLH) methodology. Referring to FIGS. 1–4A and 4B, during set up, the user elevates the projector 102 first in a vertical direction e.g., by lifting the front edge 150, resulting in two or the projector's corners being raised from and two corners being in contact with the desktop 104 as shown in FIG. 4A. The user elevates the front edge 150 by e.g., raising and lowering the projector's elevators 120. The user then rotates the projector horizontally resulting in a third corner 152 being elevated from the desktop 104 as shown in FIG. 4B. The FVLH methodology of rotating the projector 102, therefore, results in three of the projector's four corners not resting on the desktop 104 necessitating a support (not shown in FIGS. 4A–B) for its implementation.

Figure 5:
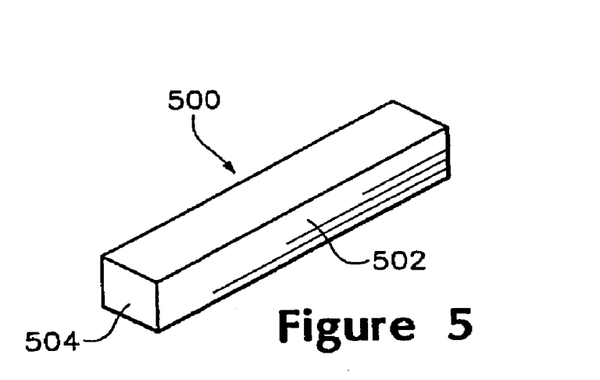
FIG. 5 is an embodiment of a support bar.
Figure 6A:
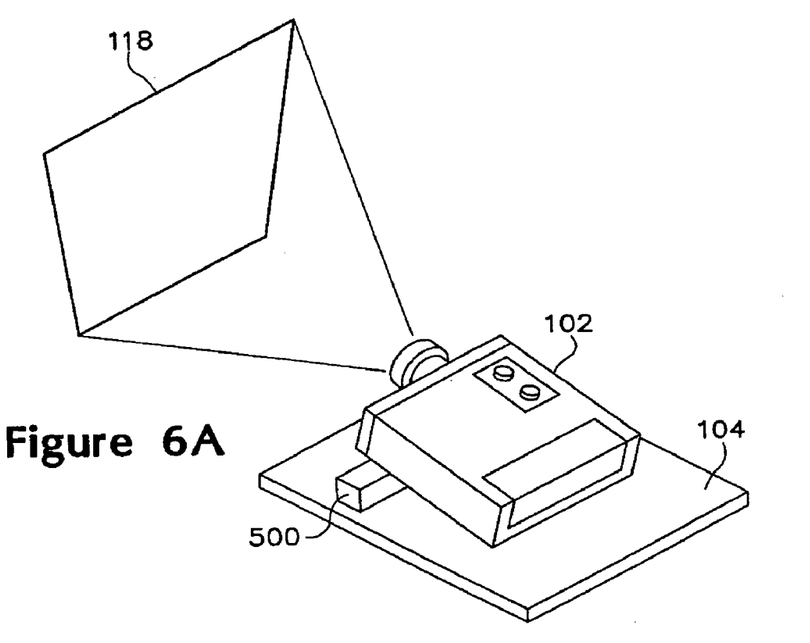
FIGS. 6A and 6B are graphic representations of using the support bar of FIG. 5 to implement the FVLH methodology.
Figure 6B:
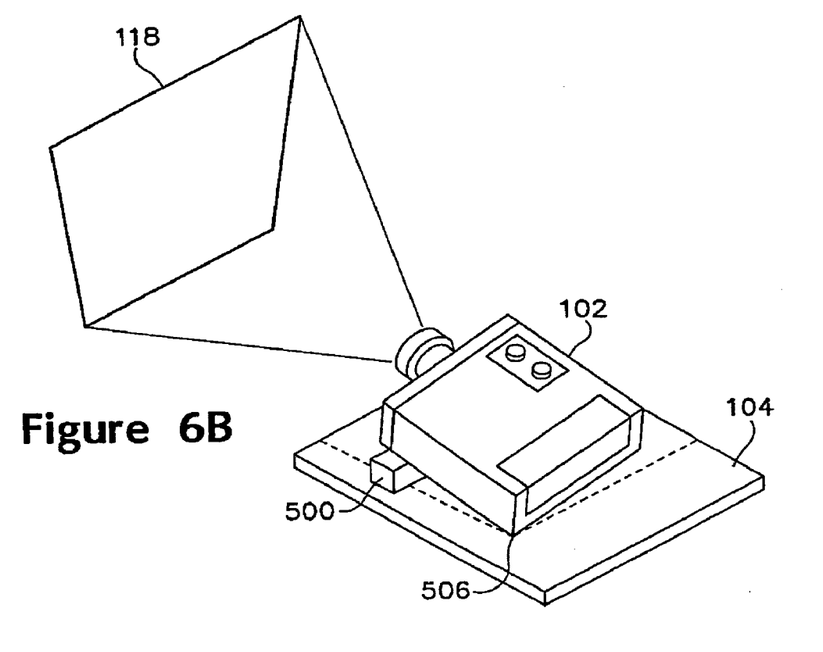

FIG. 5 is an embodiment of a support bar according to the present invention. The support bar 500 has a substantially rectangular shape with sidewalls 502 and end walls 504. A person of reasonable skill in the art should recognize the support bar 500 might have other geometric shapes equally suited to support the projector 102. The support bar 500 is positioned underneath and might be movably coupled to the projector 102 during and after set up. Any number of well-known coupling means might be used to coupled the projector 102 to the support bar 500. Referring to FIGS. 6A and 6B, the projector 102 is first raised vertically on the support bar 500 and then rotated horizontally. The support bar 500 remains positioned under the projector 102 when the user horizontally rotates it. Although a single corner 506 remains in contact with the desktop 104, the support bar 500 steadies the projector 102 on the desktop 104.

Figure 7:
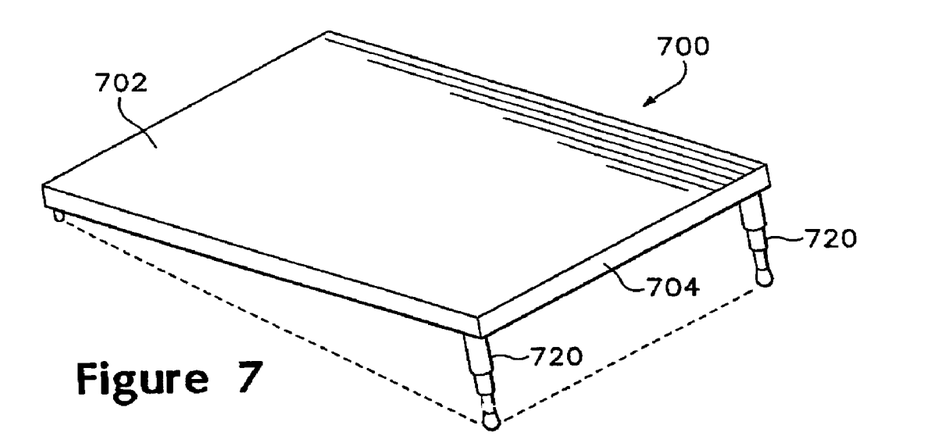
FIG. 7 is an embodiment of a platform.

FIG. 7 is an embodiment of a support platform 700 according to the present invention. The platform 700 is positioned underneath the projector 102. The platform 700 includes an inclined support wall 702. The projector 102 sits atop the inclined support wall 702.

An extendible front section 704 telescopes upwardly to vertically raise the inclined wall 702 and, consequently, the projector 102. In one embodiment, the front section 704 comprises wall sections (not shown) that might be manually extended upward. Or the front wall 704 might include a motor (not shown) that electronically extends the wall sections to automatically raise the projector 102. In another embodiment, the front section 704 comprises a pair of elevators 720 that either manually or electronically (using motors) raises the inclined wall 702 and the projector 102. A person of reasonable skill in the art should identify various other mechanisms comprising the front section 704 to elevate the support wall 702 as coming within the scope of the present invention.

Figure 8A:
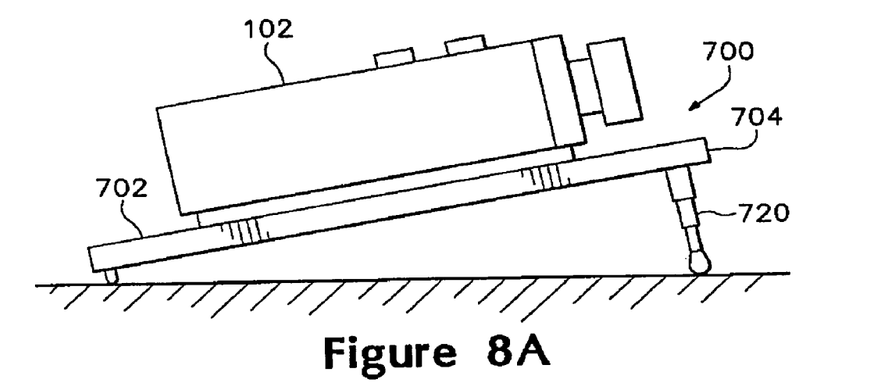
FIGS. 8A and 8B are graphic representations of using the platform of FIG. 7 to implement the FVLH methodology.
Figure 8B:
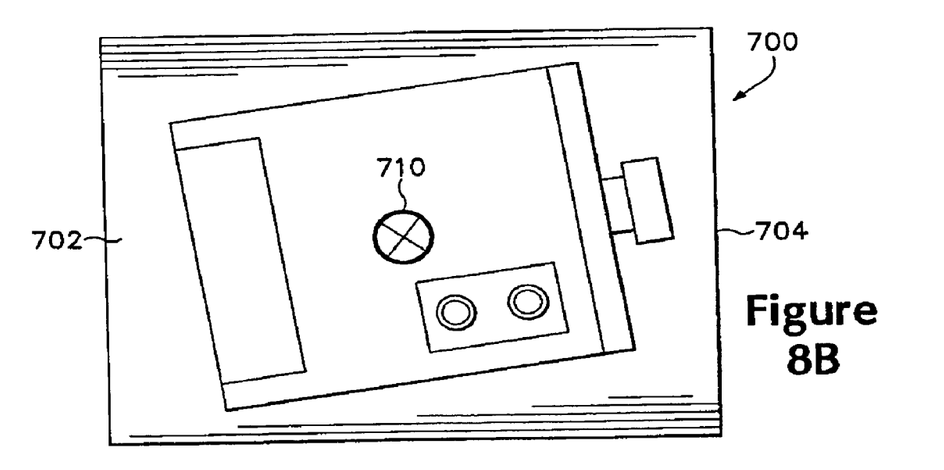

Referring to FIGS. 8A and 8B, the projector is placed on the support wall 702. FIG. 8A is a side view of the platform 700 and the projector 102. Referring to FIG. 8A, a user raises the front section 704 either manually or electronically. Manually, the user might, e.g., extend front wall sections or the elevators 720. Electronically, the user might, e.g., activate a motor by holding button (not shown) down for as long as necessary to raise the wall 702 and the projector 102 to the desired height.

FIG. 8B is a top view of the platform 700 and the projector 102. After the projector 102 is elevated, the user horizontally rotates the projector 102 about the axis 710. The projector 102 is steady on the platform 700 because all four of its corners are in full contact with the surface 702.

Figure 9:
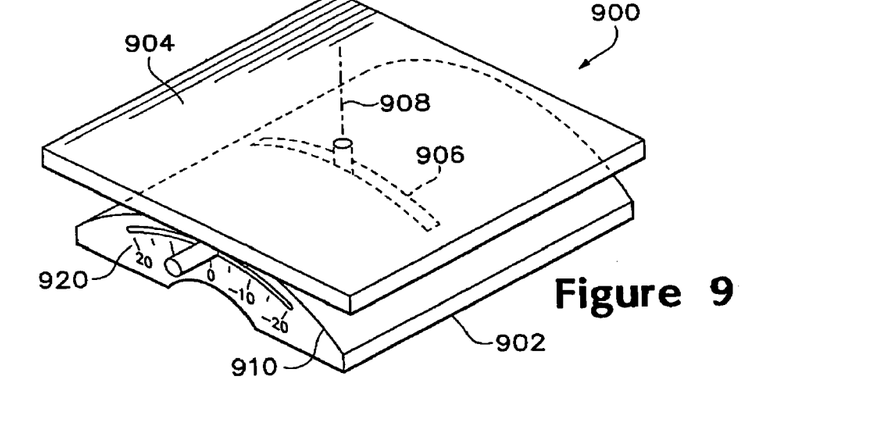
FIG. 9 is an embodiment of a platform.

FIG. 9 is an embodiment of a support platform 900 according to the present invention. The support platform 900 includes a base 902 and a member 904. The base 902 includes a curved wall 910 that, in turn, includes a plurality of channels 906. The base 902 is movably coupled to the base 902 such that the member 904 rides up and down the channels 906. The base 902 is coupled to the curved wall 910 using a variety of well-known coupling means. Additionally, the member 904 includes a center axis 908 that allows it to horizontally rotate.

Figure 10A:
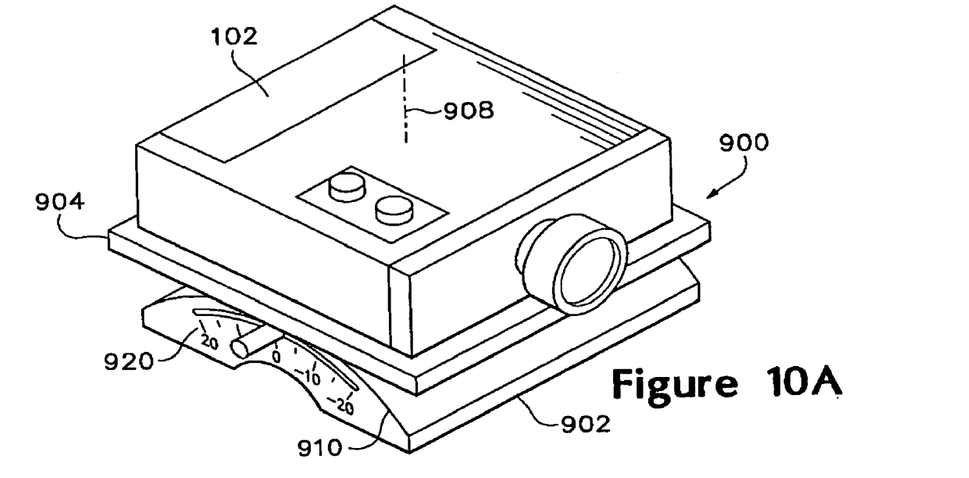
FIGS. 10A, 10B, and 10C are graphic representations of using the platform of FIG. 9 to implement FVLH methodology.
Figure 10B:
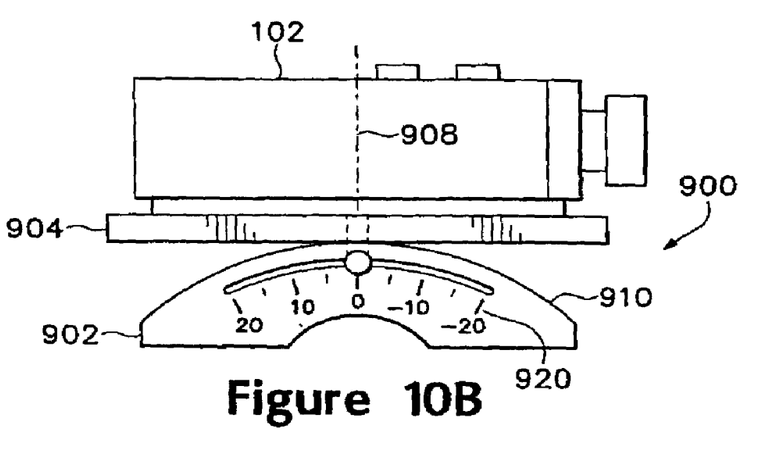
Figure 10C:
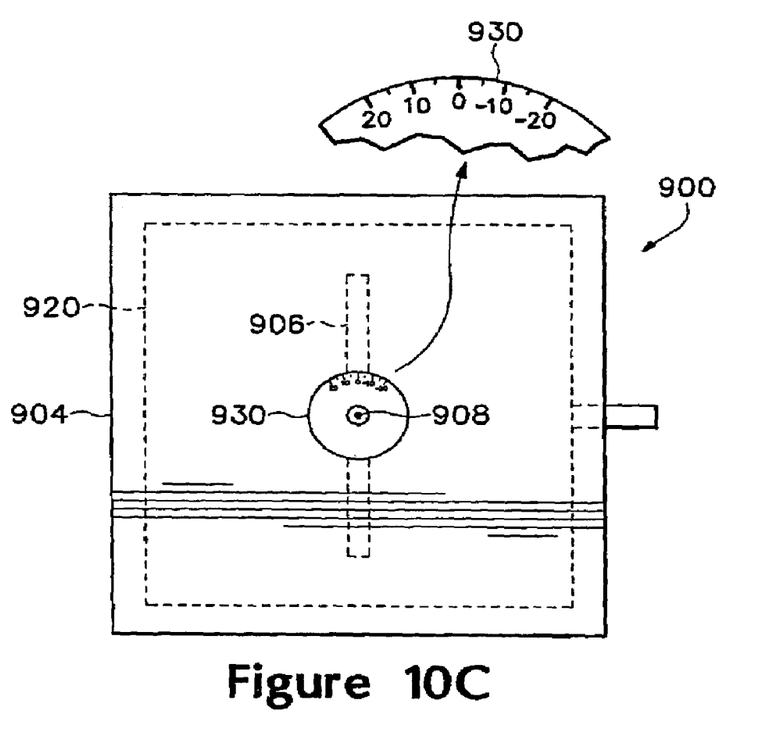

Referring to FIGS. 10A–C, the projector 102 sits on top of the member 904 and moves vertically on the curved wall 910. That is, the projector 102 moves up and down the channels 906 on the curved wall 910. In one embodiment, the curved wall 910 might include a vertical gauge 920 (FIG. 10B) allowing the user to more accurately adjust and identify the vertical orientation of the projector 102. In another embodiment, the member 904 might include a horizontal gauge 930 to more accurately adjust and identify the horizontal orientation of the projector 102 (FIG. 10C). The vertical and horizontal gauges 920 and 930 might be marked with degrees of rotation or general position as shown in FIGS. 10B and 10C. The gauges 920 and 930 allow for more accurate keystone correction distortion since the user does not need to guess at vertical and horizontal orientation of the projector 102. To effectuate keystone correction, the user inputs the horizontal and vertical positions of the projector 102 as reflected in the gauges 920 and 930, respectively, to the projector's hardware and software using, e.g., a graphical user interface (not shown). The projector 102 implements keystone correction by (pre) distorting the image data such the image cast on the surface 114 does not exhibit keystoning. The projector 102 (pre) distorts the image data by horizontally and vertically scaling it responsive to the user's identification of the projector's horizontal and vertical position.

The platform 900 might include motors, e.g., step motors, coupled to the base 902 and the member 904 to automatically move the projector 102 vertically and horizontally. The step motors might be actuated using a variety of well-known actuation devices, e.g., buttons. The projector's electronics can read the motor steps (in the case of using a step motor) to discern the rotation angle and to, ultimately, more accurately correct for keystone distortion.

Figure 11:
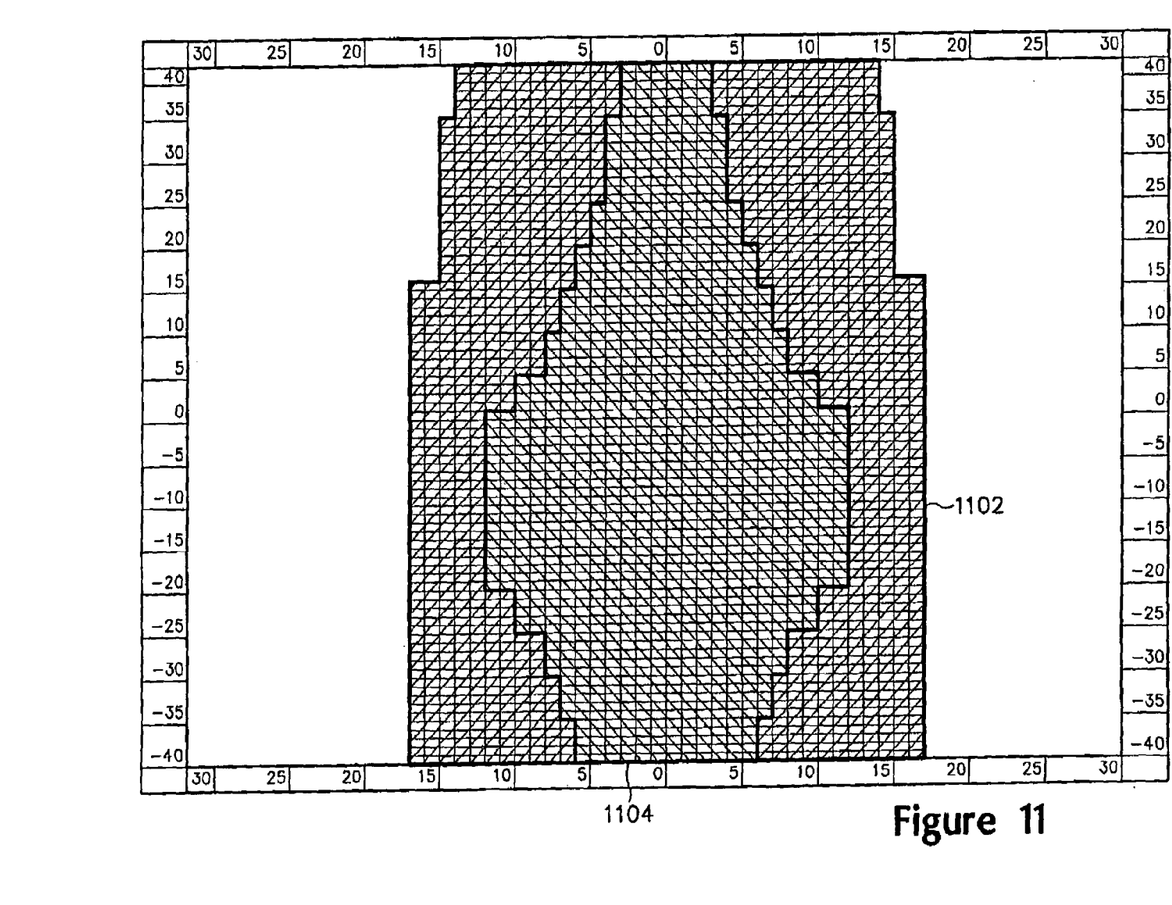
FIG. 11 is a keystone range comparison between FHLV and FVLH methodologies.

FIG. 11 is a keystone range comparison between FHLV and FVLH methodologies. Referring to FIG. 11, the area 1102 represents the additional keystone correction range provided by the FVLH methodology relative to the area 1104 that represents the range provided by the FHLV methodology.

Having illustrated and described the principles of our invention(s), it should be readily apparent to those skilled in the art that the invention(s) can be modified in arrangement and detail without departing from such principles. We claim all modifications coming within the spirit and scope of the accompanying claims.

We claim:

1. A method for correcting distortion of an image projected on a projection surface, comprising:
    mounting a projector on a top member movably coupled to a bottom member of a platform;
    moving the top member along a curved wall of the bottom member such that the projector moves about a vertical axis; and
    rotating the top member about an axis point of the bottom member such that the projector rotates about a horizontal axis after moving the projector about the vertical axis.

2. The method of claim 1 comprising providing the bottom member with a vertical scale to measure the projector's movement about the vertical axis.

3. The method of claim 1 comprising providing the top member with a horizontal scale to measure the projector's rotation about the horizontal axis.

4. The method of claim 1 comprising increasing a keystone range of the projector responsive to the moving followed by the rotating.

5. A system, comprising:
    a projector for projecting an image on a projection surface; and
    a platform including a top member movably mounted to a bottom member to support the projector, the top member being adapted to vertically move along a curved wall of the bottom member and being adapted to horizontally rotate about an axis point of the bottom member;
    where the projector corrects for keystone distortion responsive to the projector's vertical and horizontal position.

6. The system of claim 5 where the platform increases the keystone range of the projector.

7. The system of claim 5
    where the bottom member is aligned horizontally; and
    where the projector is fixedly mounted to the top member.

8. The system of claim 5 where the bottom member includes a vertical scale to measure the projector's movement about a vertical axis.

9. The system of claim 5 where the top member includes a horizontal scale to measure the projector's rotation about a horizontal axis.

10. An apparatus, comprising:
    means for projecting an image on a projection surface; and
    means for supporting the means for projecting including a top member means movably mounted to a bottom member means, the top member means being adapted to vertically move along a curved means of the bottom member means and being adapted to horizontally rotate about an axis means of the bottom member means;
    where the means for projecting keystone corrects responsive to the means for rotating.

11. The apparatus of claim 10 where the means for supporting increases the keystone range of the means for projecting.

12. The apparatus of claim 10 where the bottom member means includes a vertical scaling means to measure the means for projecting's movement about a vertical axis.

13. The apparatus of claim 10 where the top member means includes a horizontal scaling means to measure the means for projecting's rotation about a horizontal axis.

* * * * *